(12) United States Patent
Lee

(10) Patent No.: US 12,097,789 B2
(45) Date of Patent: Sep. 24, 2024

(54) CONSTRUCTION MACHINE

(71) Applicant: HD HYUNDAI INFRACORE CO., LTD., Incheon (KR)

(72) Inventor: Jae Dong Lee, Incheon (KR)

(73) Assignee: HD HYUNDAI INFRACORE CO., LTD., Incheon (KR)

(*) Notice: Subject to any disclaimer, the term of this patent is extended or adjusted under 35 U.S.C. 154(b) by 0 days.

(21) Appl. No.: 17/683,652

(22) Filed: Mar. 1, 2022

(65) Prior Publication Data
US 2022/0281367 A1    Sep. 8, 2022

(30) Foreign Application Priority Data

Mar. 2, 2021 (KR) .................. 10-2021-0027638

(51) Int. Cl.
*B60H 1/32* (2006.01)
*B60H 1/00* (2006.01)
*B60H 1/24* (2006.01)
*B60N 2/56* (2006.01)

(52) U.S. Cl.
CPC ....... *B60N 2/5635* (2013.01); *B60H 1/00207* (2013.01); *B60N 2/5657* (2013.01); *B60H 2001/00242* (2013.01); *B60Y 2200/412* (2013.01)

(58) Field of Classification Search
CPC .. B60N 2/5635; B60N 2/5657; B60N 2/5628; B60N 2/565; B60N 2/5621; B60N 2/5642; B60N 2/66
See application file for complete search history.

(56) References Cited

U.S. PATENT DOCUMENTS

| | | | |
|---|---|---|---|
| 5,860,593 A * | 1/1999 | Heinle ................. | B60H 1/0075 165/204 |
| 6,019,420 A | 2/2000 | Faust et al. | |
| 6,227,611 B1 * | 5/2001 | Dauvergne ......... | B60H 1/00028 180/90 |
| 10,391,901 B2 * | 8/2019 | Bergweiler .......... | B60N 2/7011 |

(Continued)

FOREIGN PATENT DOCUMENTS

| | | |
|---|---|---|
| CN | 1101920673 A | 12/2010 |
| CN | 103347722 A | 10/2013 |

(Continued)

OTHER PUBLICATIONS

The extended European Search Report dated Jul. 29, 2022 for corresponding European Patent Application No. 22159716.4, 9 pages.

(Continued)

*Primary Examiner* — Shin H Kim
(74) *Attorney, Agent, or Firm* — Hauptman Ham, LLP

(57) ABSTRACT

The present invention provides a construction machine, which includes a cabin in which a driver is seated, the construction machine including a ventilated seat having fans, an air conditioning device configured to adjust an internal temperature of the cabin, and ducts extending from the air conditioning device and configured to guide an air flow, in which the ducts branches to include a first duct extending toward an upper side of the cabin, and a second duct extending toward a rear side of the ventilated seat. Therefore, it is possible to improve a cooling effect that the driver actually feels.

11 Claims, 15 Drawing Sheets

(56) References Cited

U.S. PATENT DOCUMENTS

| | | | |
|---|---|---|---|
| 11,091,074 B1* | 8/2021 | Jeong | B60N 2/58 |
| 2003/0019509 A1* | 1/2003 | Locascio | B08B 17/00 |
| | | | 134/10 |
| 2007/0125520 A1* | 6/2007 | Nutsos | F28G 9/00 |
| | | | 165/41 |
| 2012/0144844 A1* | 6/2012 | Park | B60N 2/5657 |
| | | | 62/3.3 |
| 2012/0261974 A1* | 10/2012 | Yoshizawa | B60N 2/5657 |
| | | | 297/452.42 |
| 2012/0273160 A1* | 11/2012 | Hipp-Kalthoff | B60H 1/3233 |
| | | | 454/143 |
| 2013/0084789 A1* | 4/2013 | Morishita | B60H 1/32 |
| | | | 454/75 |
| 2013/0299128 A1 | 11/2013 | Bergamini | |
| 2015/0183348 A1* | 7/2015 | Zhang | B60N 2/56 |
| | | | 297/180.13 |
| 2015/0224853 A1* | 8/2015 | Errick | B60H 1/3407 |
| | | | 454/145 |
| 2015/0266404 A1* | 9/2015 | Sakane | B60N 2/5657 |
| | | | 297/452.42 |
| 2016/0250905 A1* | 9/2016 | Tanaka | B60N 2/5657 |
| | | | 454/75 |
| 2016/0304013 A1* | 10/2016 | Wolas | B60N 2/5657 |
| 2018/0229633 A1* | 8/2018 | Bergweiler | B60N 2/5642 |
| 2019/0160417 A1* | 5/2019 | Matsumoto | B01D 53/0462 |
| 2019/0291666 A1* | 9/2019 | Martin | B60H 1/3233 |
| 2019/0389345 A1* | 12/2019 | Kim | F04D 29/4226 |
| 2020/0180478 A1* | 6/2020 | Sago | B60N 2/5657 |
| 2021/0039530 A1* | 2/2021 | Wilson | B60N 2/5685 |
| 2021/0078471 A1* | 3/2021 | Fujita | B60N 2/58 |
| 2021/0114734 A1* | 4/2021 | Bultemeier | B60N 2/5685 |
| 2021/0155129 A1* | 5/2021 | Artmeier | B60N 2/5657 |
| 2021/0178946 A1* | 6/2021 | Duriez | B60N 2/565 |
| 2021/0261025 A1* | 8/2021 | Seki | B60H 1/34 |
| 2021/0309134 A1* | 10/2021 | Kawashima | B60H 1/00 |
| 2022/0000191 A1* | 1/2022 | Cauchy | A47C 7/748 |
| 2022/0176855 A1* | 6/2022 | Pfaff | B60N 2/5635 |
| 2022/0281367 A1* | 9/2022 | Lee | B60H 1/00378 |
| 2022/0332228 A1* | 10/2022 | Park | B60N 2/5642 |

FOREIGN PATENT DOCUMENTS

| | | |
|---|---|---|
| EP | 0 934 847 A2 | 8/1999 |
| JP | H5-42351 U | 6/1993 |
| JP | 2003-291629 A | 10/2003 |
| JP | 2010-195196 A | 9/2010 |
| JP | 2017-87896 A | 5/2017 |
| WO | 2020/021894 A1 | 1/2020 |

OTHER PUBLICATIONS

Office Action issued on Mar. 23, 2023, for corresponding Chinese patent application No. 202210200048.1 (8 pages).

* cited by examiner

CONSTRUCTION MACHINE

CROSS REFERENCE TO RELATED APPLICATION

The present application claims priority to Korean Patent Application No. 10-2021-0027638, filed Mar. 2, 2021, the entire contents of which is incorporated herein for all purposes by this reference.

BACKGROUND OF THE INVENTION

Field of the Invention

The present invention relates to a construction machine, and more particularly, to a construction machine equipped with a ventilated seat.

Description of the Related Art

In general, a construction machine such as an excavator or a wheel loader includes a cabin in which a driver may be seated. FIG. 1 illustrates a construction machine including a cabin 20. An air conditioning device is provided in the cabin 20. The air conditioning device establishes a comfortable working environment by adjusting an indoor temperature of the cabin 20 and prevents frost from forming on a window.

When an outside atmospheric temperature is considerably high as in the summer season, a sensible temperature, which a driver feels, is not significantly decreased only by a cooling operation of the air conditioning device. To solve the problem, a construction machine in the related art is equipped with a ventilated seat, thereby providing a more comfortable working environment.

However, as illustrated in FIGS. 2 and 3, in a construction machine in the related art, an air conditioning device 24 and a nozzle 26 are positioned rearward from a seat 22 and spray air toward an upper side of a driver's head. Therefore, even though the seat 22 is configured as a ventilated seat, the air reaches the driver after a temperature of the air is significantly raised while the air circulates in the cabin 20. For this reason, an effect of the ventilated seat, which the driver actually feels, is not high. In addition, because a lower end of the seat 22 is coupled to a suspension 23 and blocks a part of an air flow in the construction machine, a sensible effect inevitably deteriorates.

Because the cooling effect is related to work efficiency, there is a need for a technology capable of improving a sensible effect of cooling the construction machine equipped with the ventilated seat.

SUMMARY OF THE INVENTION

The present invention has been made in an effort to provide a construction machine capable of improving a sensible effect of cooling the construction machine equipped with a ventilated seat.

The present invention provides a construction machine, which includes a cabin in which a driver is seated, the construction machine including: a ventilated seat having fans; an air conditioning device configured to adjust an internal temperature of the cabin; and ducts extending from the air conditioning device and configured to guide an air flow, in which the ducts branches to include: a first duct extending toward an upper side of the cabin; and a second duct extending toward a rear side of the ventilated seat.

In addition, the construction machine may further include: a first nozzle disposed at an end of the first duct; and a second nozzle disposed at an end of the second duct, and the second nozzle may be opened in a direction in which the air is discharged toward the ventilated seat.

In addition, the second nozzle may be configured as a variable nozzle capable of adjusting a direction in which the air is discharged.

In addition, the ventilated seat may include a backrest configured to support the driver's upper body, and a first fan may be installed in the backrest.

In addition, the ventilated seat may include a cushion configured to support the driver's lower body, and a second fan may be installed in the cushion.

In addition, the second fan may protrude from a lower-most end of the ventilated seat.

In addition, the construction machine may further include a second nozzle disposed at an end of the second duct, and the second nozzle may be disposed at the same height as the second fan.

In addition, the second duct may branch off from a most upstream side of the first duct.

In addition, the first duct may include: a first part extending upward; and a second part branching off from an upstream side of the first part in a lateral direction.

In addition, another embodiment of the present invention provides a construction machine, which includes a cabin in which a driver is seated, the construction machine including: a ventilated seat having fans; an air conditioning device configured to adjust an internal temperature of the cabin; ducts extending from the air conditioning device and configured to guide an air flow, the ducts branching to include a first duct extending to an upper side of the cabin, and a second duct extending to a rear side of the ventilated seat; a first nozzle disposed at an end of the first duct; and a second nozzle disposed at an end of the second duct, in which the second nozzle is opened in a direction in which air is discharged toward the ventilated seat, the ventilated seat includes a cushion configured to support the driver's lower body, and a second fan is installed in the cushion.

In this case, the second nozzle may be installed at a lower height than the second fan.

In addition, the air conditioning device may be installed at a rear side of the ventilated seat.

In addition, the air conditioning device may be installed at a lateral side of the ventilated seat.

In addition, the air conditioning device may be installed at a lower side of the ventilated seat.

The construction machine according to the embodiment of the present invention may improve the cooling effect that the driver feels. Therefore, it is possible to establish a more comfortable working environment and improve working convenience and working efficiency.

DETAILED DESCRIPTION OF THE INVENTION

Hereinafter, a construction machine according to embodiments of the present invention will be described in detail with reference to the accompanying drawings.

Figure 1:
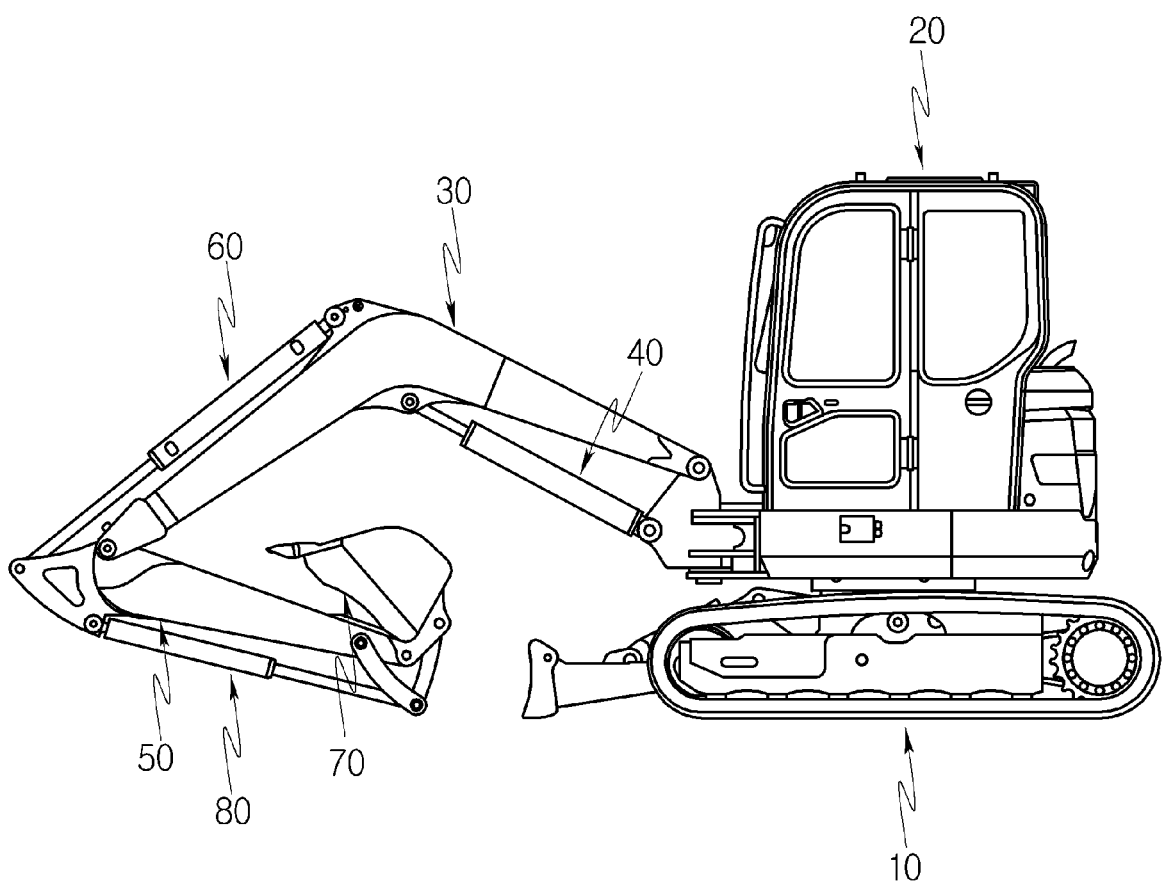
FIG. 1 is a front view schematically illustrating a construction machine.
Figure 2:
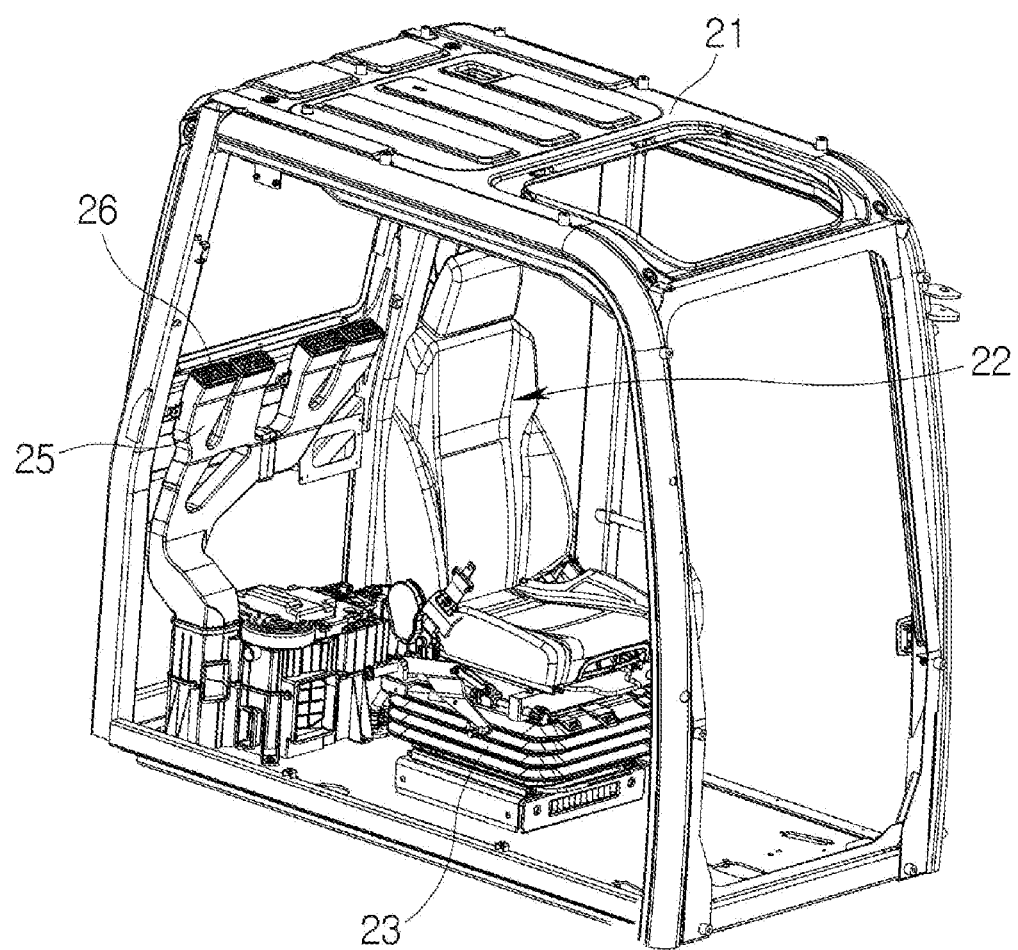
FIG. 2 is a perspective view illustrating a cabin of a construction machine in the related art.
Figure 3:
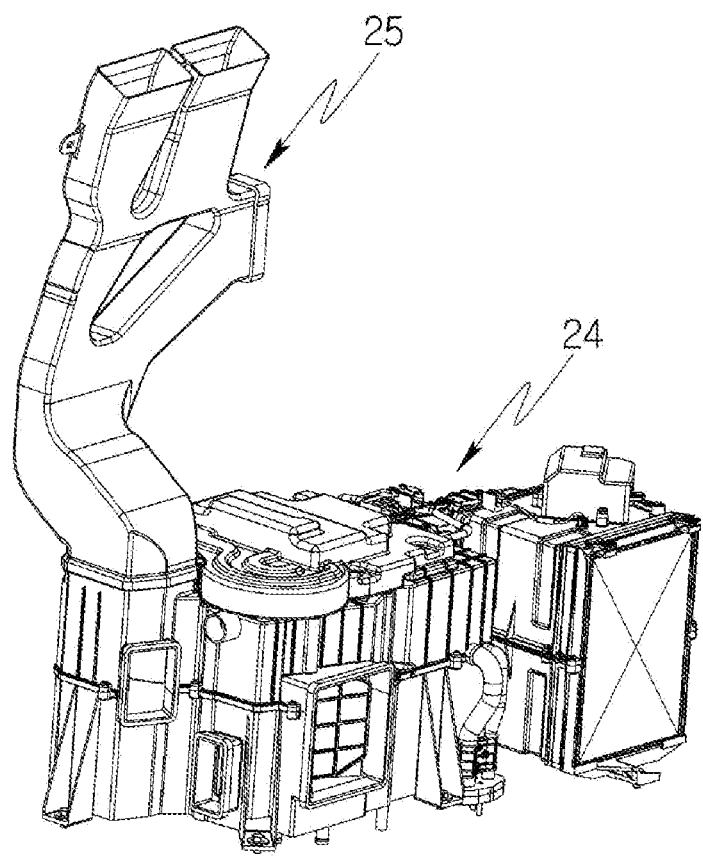
FIG. 3 is a perspective view illustrating an air conditioning device mounted in the construction machine in the related art.
Figure 4:
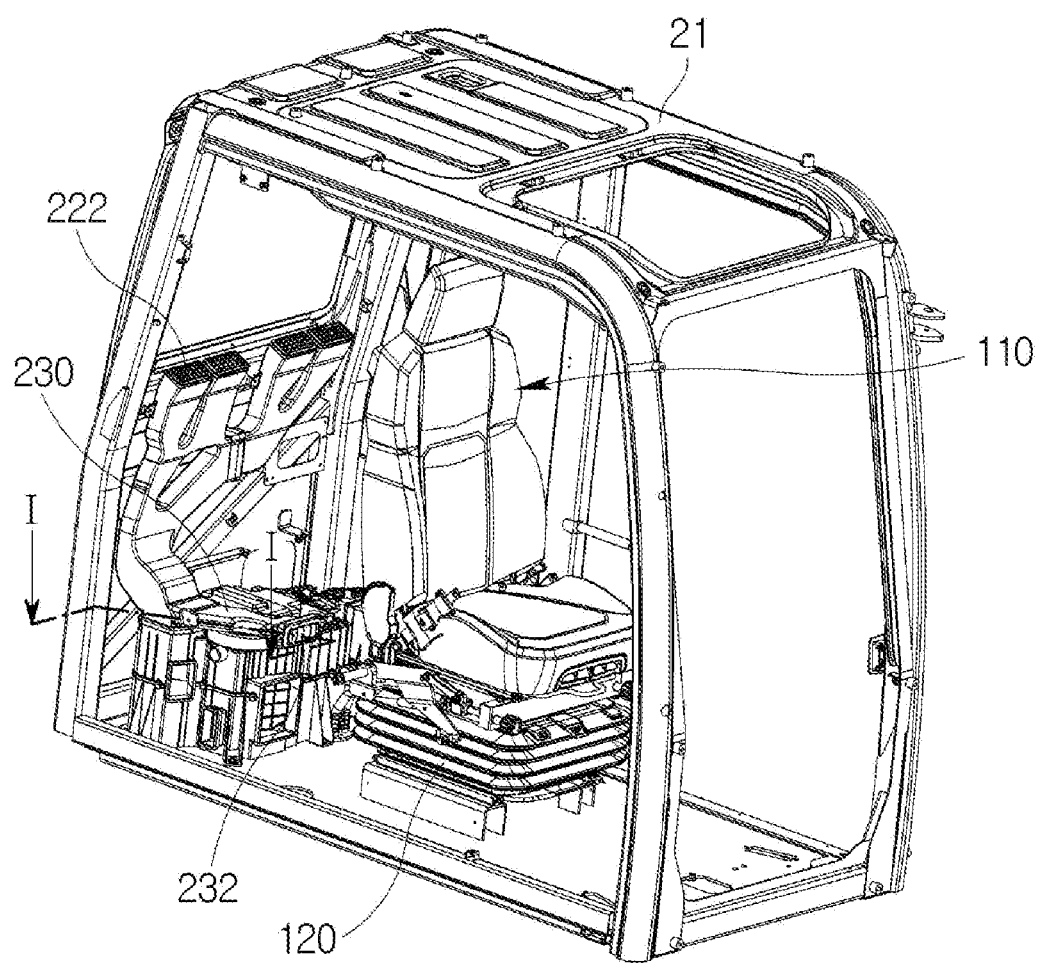
FIG. 4 is a perspective view illustrating a cabin of a construction machine according to an embodiment of the present invention.
Figure 5:
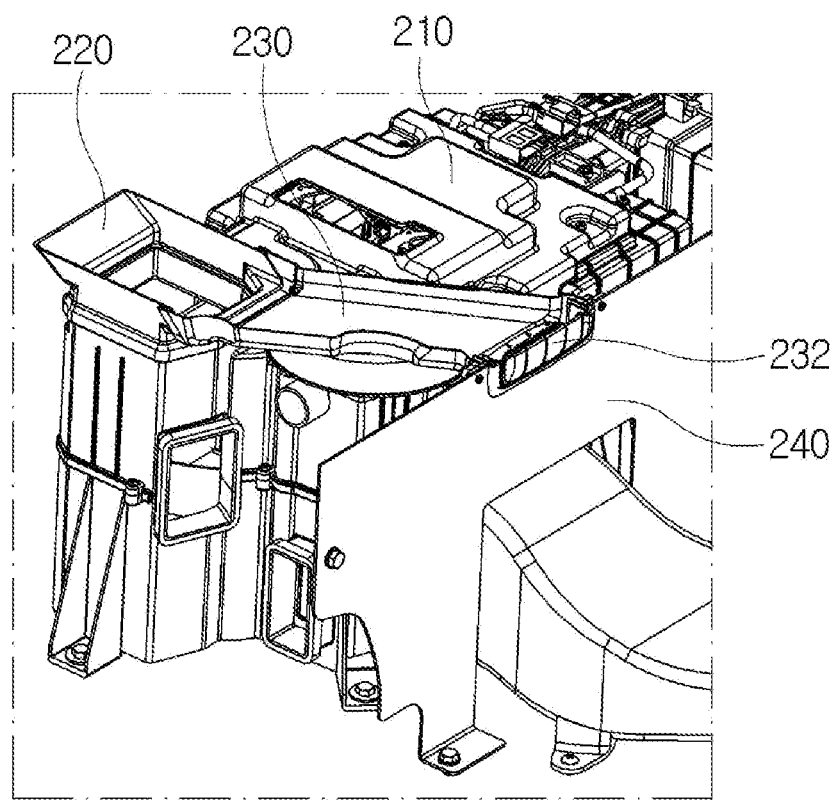
FIG. 5 is a cut-away perspective view illustrating a second duct of the construction machine according to the embodiment of the present invention.
Figure 6:
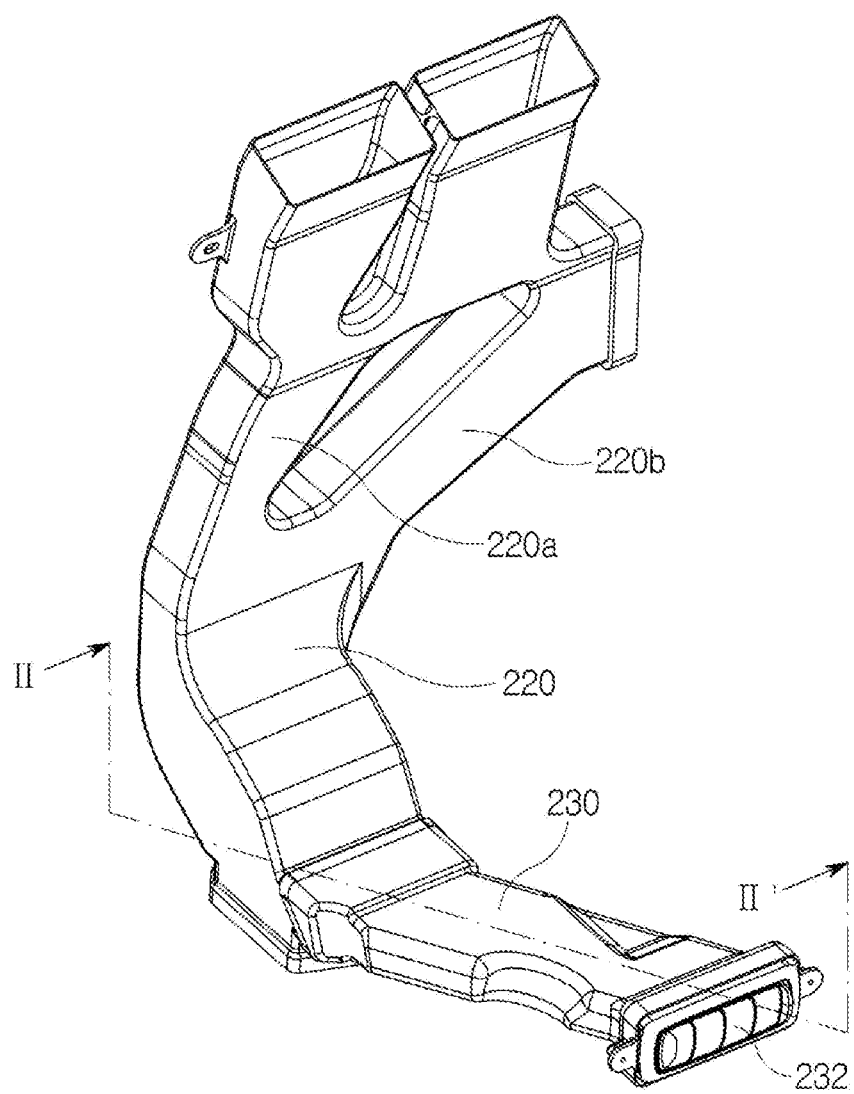
FIG. 6 is a perspective view illustrating a first duct and the second duct of the construction machine according to the embodiment of the present invention.
Figure 7:
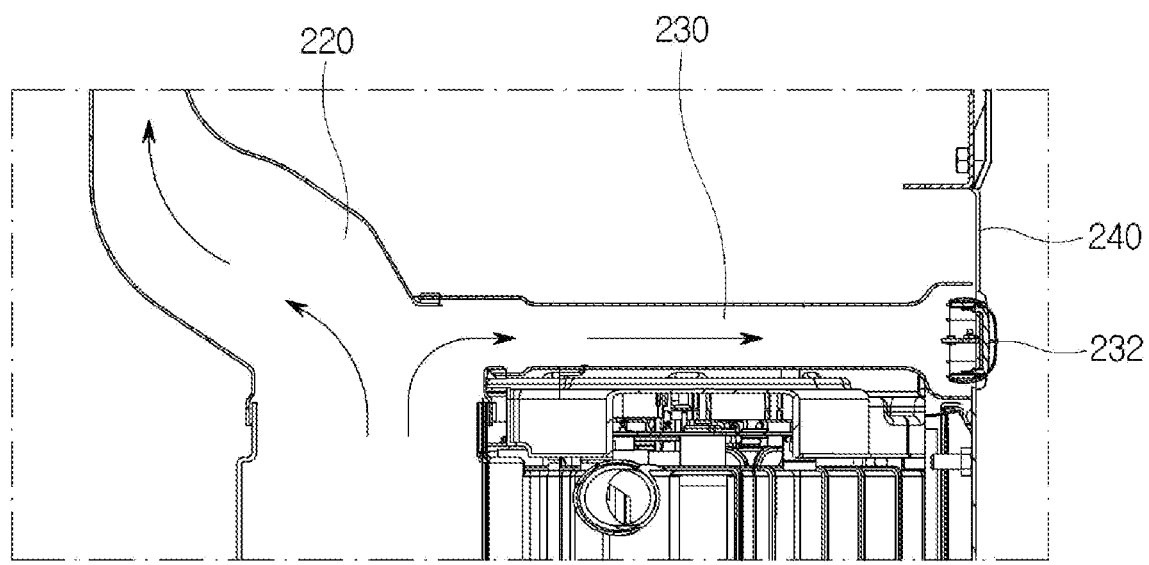
FIG. 7 is a cross-sectional view illustrating an air flow in the first and second ducts of the construction machine according to the embodiment of the present invention.
Figure 8:
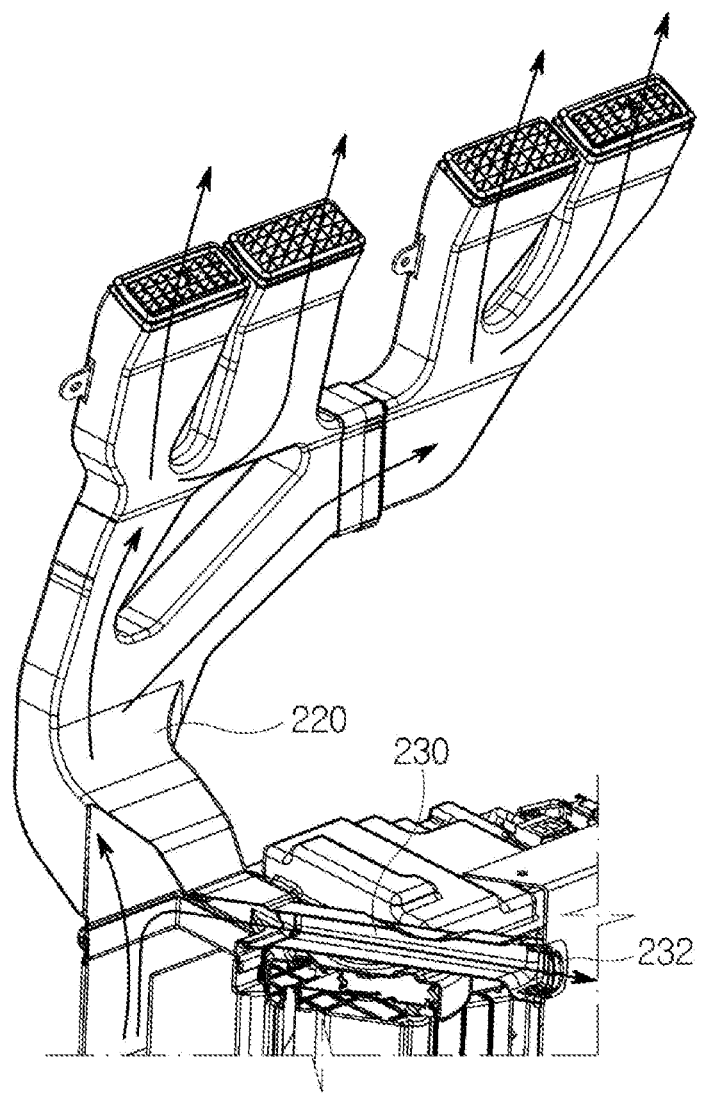
FIG. 8 is a perspective view illustrating an air flow in the first and second ducts of the construction machine according to the embodiment of the present invention.
Figure 9:
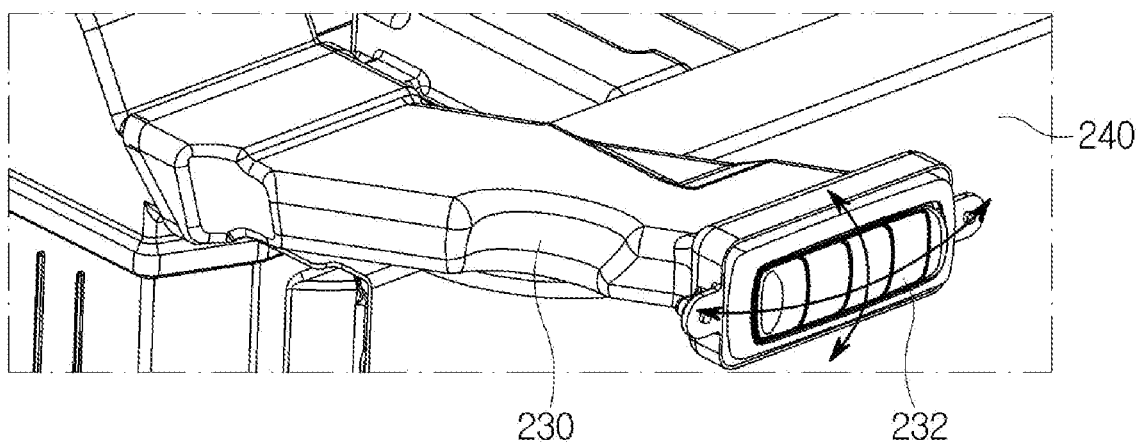
FIG. 9 is a perspective view illustrating a second nozzle of the construction machine according to the embodiment of the present invention.
Figure 10:
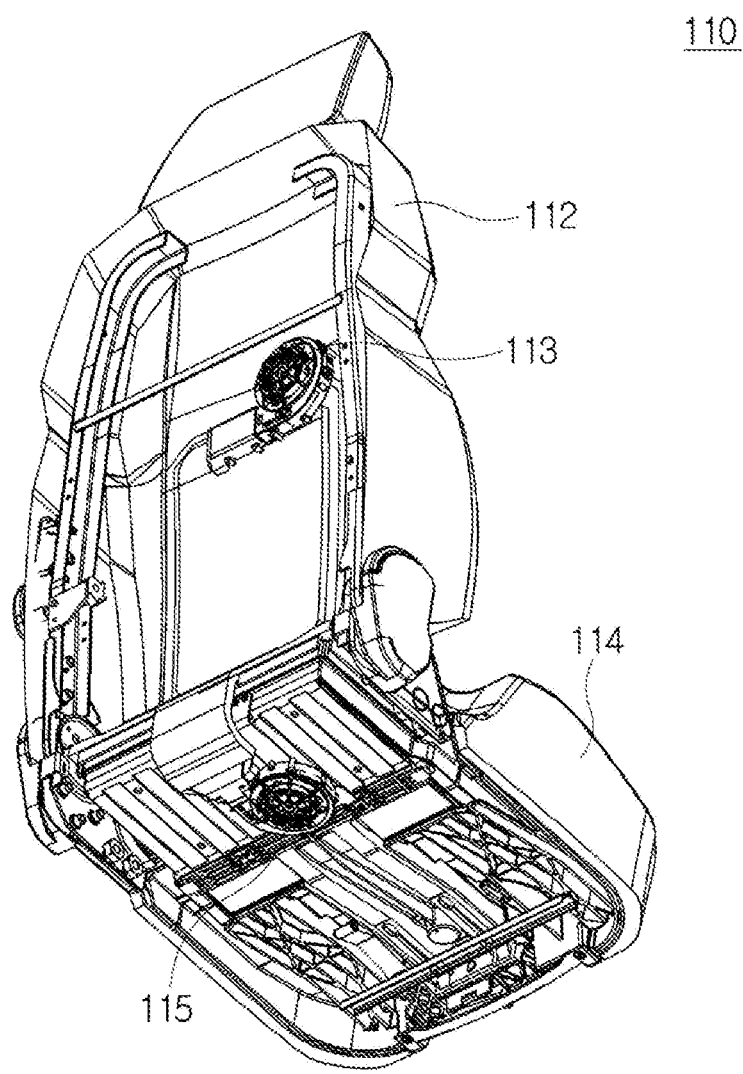
FIG. 10 is a perspective view illustrating a ventilated seat of the construction machine according to the embodiment of the present invention.
Figure 11:
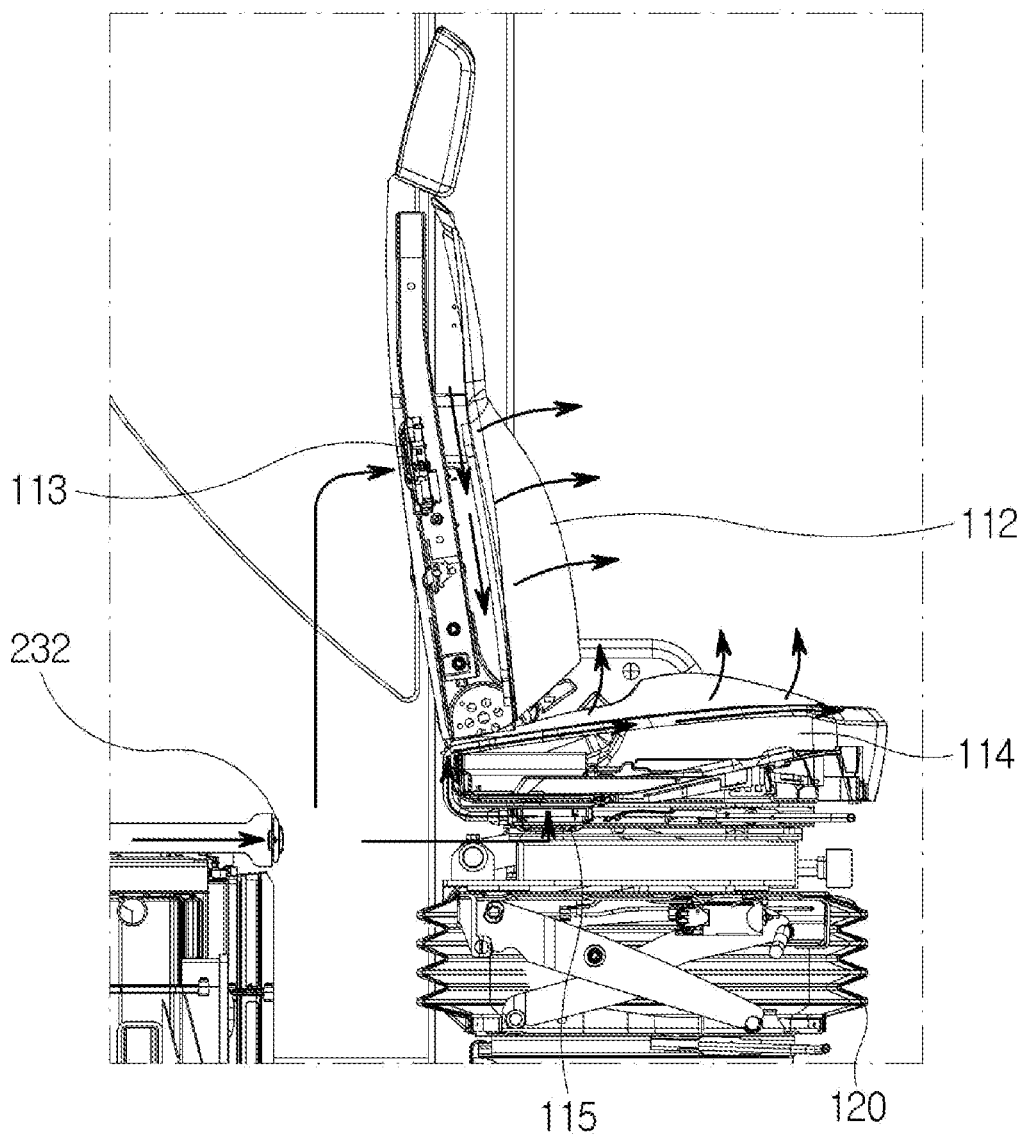
FIG. 11 is a front view illustrating an air flow in the ventilated seat of the construction machine according to the embodiment of the present invention.
Figure 12:
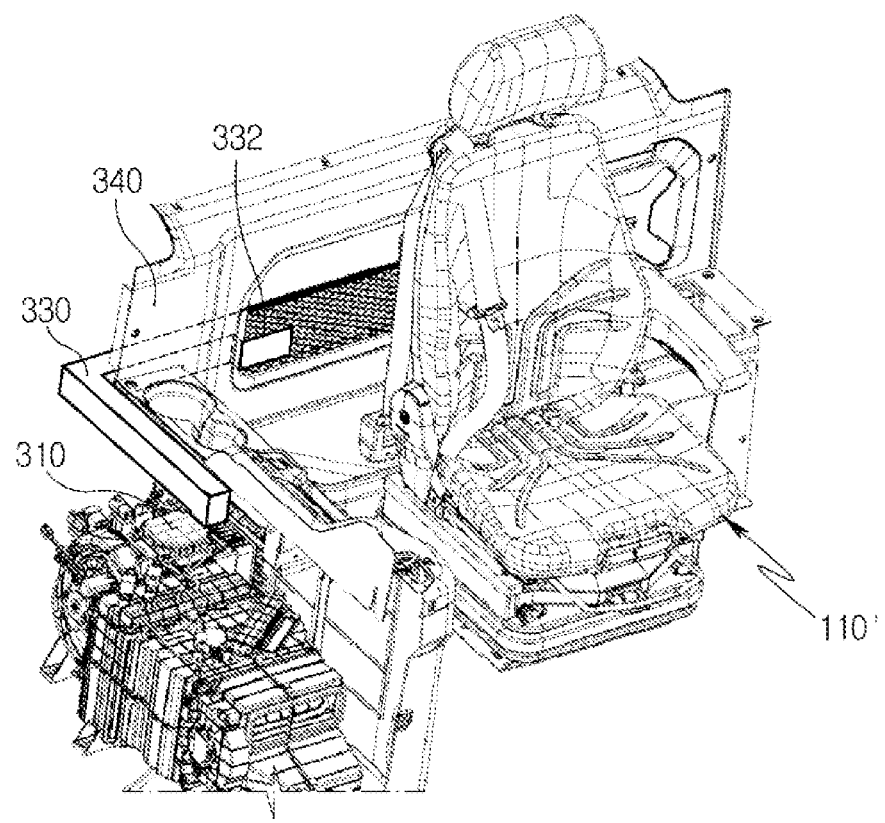
FIG. 12 is a perspective view illustrating an air flow directed toward a cabin and a ventilated seat of a construction machine according to another embodiment of the present invention.
Figure 13:
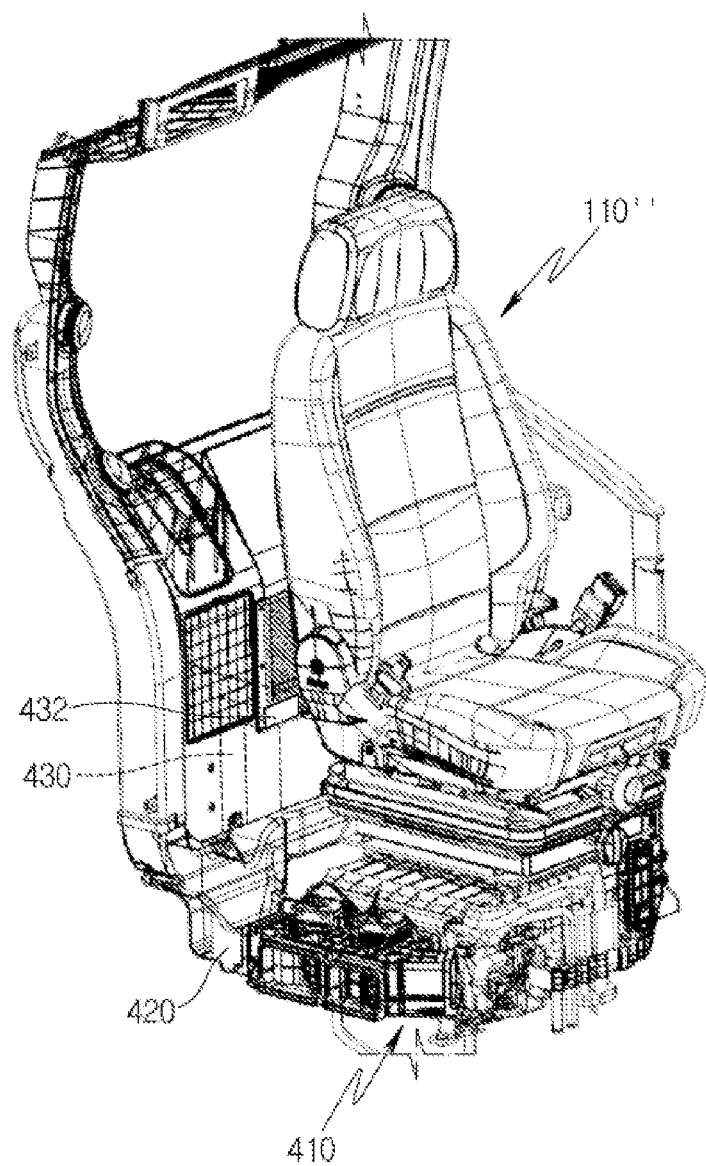
FIG. 13 is a perspective view illustrating an air flow directed toward a cabin and a ventilated seat of a construction machine according to still another embodiment of the present invention.
Figure 14:
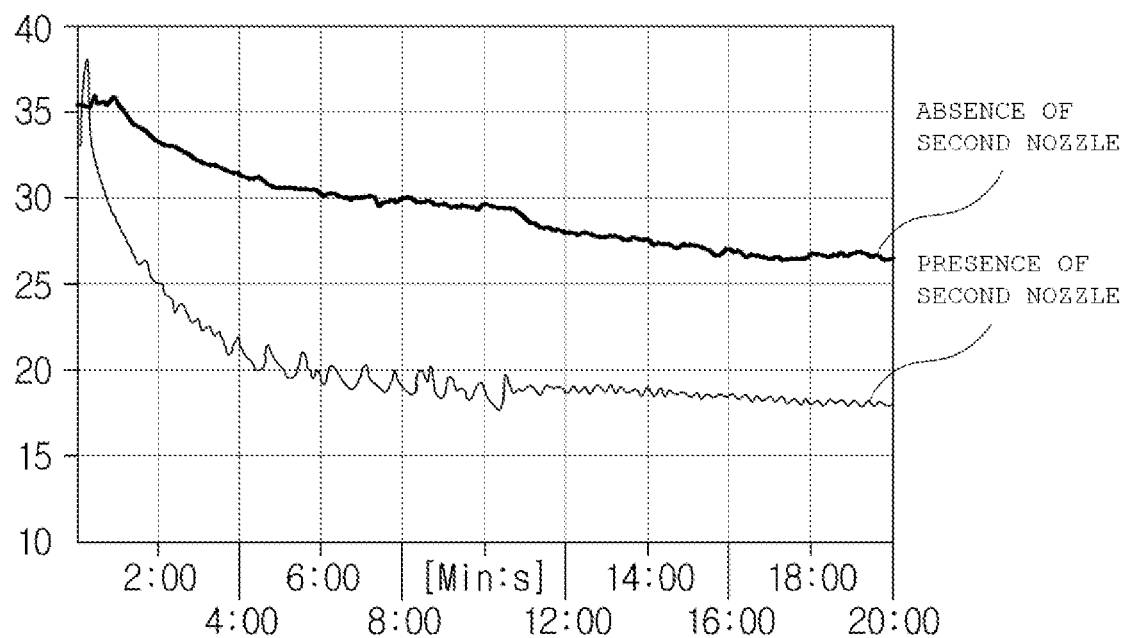
FIG. 14 is a graph illustrating a comparison between a change in temperature at a lower end of a ventilated seat of the construction machine according to the embodiment of the present invention and a change in temperature at a lower end of a ventilated seat of a construction machine in the related art.
Figure 15:
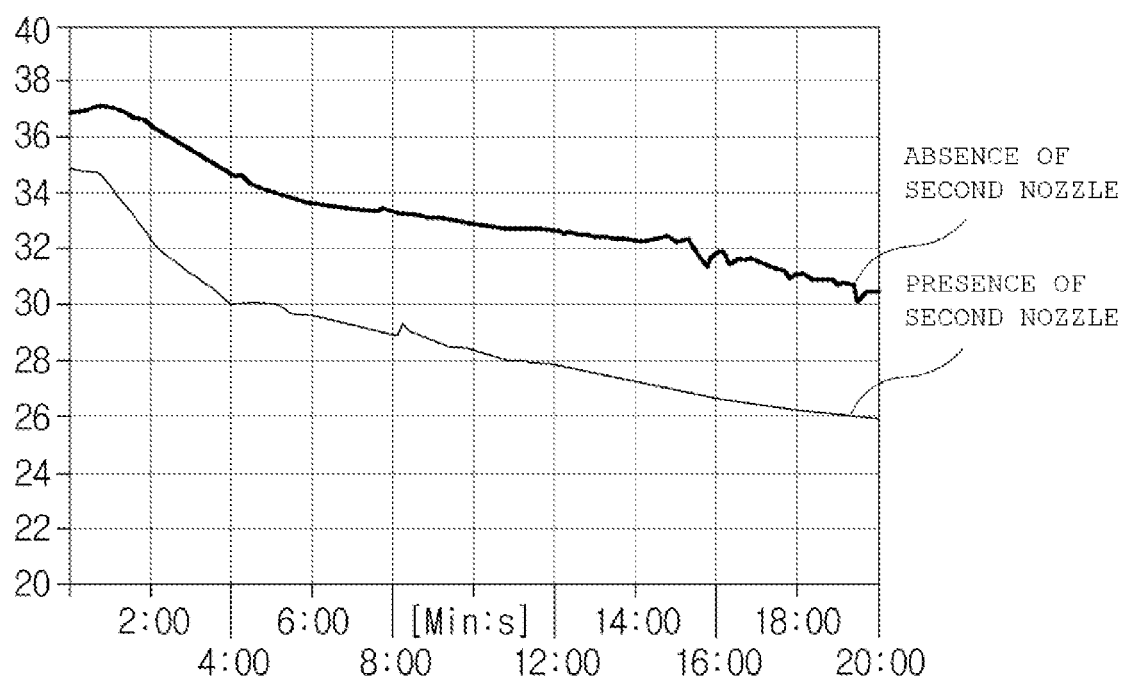
FIG. 15 is a graph illustrating a comparison between a change in temperature at an inner side of a backrest of the ventilated seat of the construction machine according to the embodiment of the present invention and a change in temperature at an inner side of a backrest of the ventilated seat of the construction machine in the related art.

FIG. 4 is a perspective view illustrating a cabin of a construction machine according to an embodiment of the present invention, FIG. 5 is a cut-away perspective view illustrating a second duct of the construction machine according to the embodiment of the present invention, FIG. 6 is a perspective view illustrating a first duct and the second duct of the construction machine according to the embodiment of the present invention, FIG. 7 is a cross-sectional view illustrating an air flow in the first and second ducts of the construction machine according to the embodiment of the present invention, FIG. 8 is a perspective view illustrating an air flow in the first and second ducts of the construction machine according to the embodiment of the present invention, FIG. 9 is a perspective view illustrating a second nozzle of the construction machine according to the embodiment of the present invention, FIG. 10 is a perspective view illustrating a ventilated seat of the construction machine according to the embodiment of the present invention, FIG. 11 is a front view illustrating an air flow in the ventilated seat of the construction machine according to the embodiment of the present invention, FIG. 12 is a perspective view illustrating an air flow directed toward a cabin and a ventilated seat of a construction machine according to another embodiment of the present invention, FIG. 13 is a perspective view illustrating an air flow directed toward a cabin and a ventilated seat of a construction machine according to still another embodiment of the present invention, FIG. 14 is a graph illustrating a comparison between a change in temperature at a lower end of a ventilated seat of the construction machine according to the embodiment of the present invention and a change in temperature at a lower end of a ventilated seat of a construction machine in the related art, and FIG. 15 is a graph illustrating a comparison between a change in temperature at an inner side of a backrest of the ventilated seat of the construction machine according to the embodiment of the present invention and a change in temperature at an inner side of a backrest of the ventilated seat of the construction machine in the related art.

As illustrated in FIGS. 4 to 8, a cabin of a construction machine according to an embodiment of the present invention includes a cabin frame 21 configured to define an external appearance, a ventilated seat 110 in which a driver is seated, a suspension 120 coupled to a lower portion of the ventilated seat 110 and configured to mitigate vibration and impact, an air conditioning device 210 installed to adjust indoor air in the cabin, first and second ducts 220 and 230 configured to guide air supplied from the air conditioning device 210, and first and second nozzles 222 and 232 disposed at ends of the first and second ducts 220 and 230 and configured to discharge air into the interior of the cabin.

The cabin frame 21 corresponds to a framework of the cabin, and a door and windows are attached to the cabin frame 21, such that the interior of the cabin has a closed space. Because the construction machine works in an environment in which a large amount of noise or dust is present, the interior of the cabin in which the driver is seated may be isolated from the outside of the cabin.

The ventilated seat 110, in which the driver is seated, has surfaces through which a plurality of fine holes is formed so that air may flow through the plurality of fine holes. The ventilated seat 110 includes a backrest 112 configured to support a driver's upper body, and a cushion 114 configured to support the driver's lower body. An inner surface of the backrest 112 and an inner surface of the cushion 114 come into direct contact with the driver when the driver is seated in the ventilated seat.

First and second fans 113 and 115 are respectively provided in the backrest 112 and the cushion 114 to implement more efficient ventilation. The first and second fans 113 and 115 serve to suck air outside the ventilated seat 110 and forcibly circulate the air in the cabin. Then, cold air sprayed from holes formed in surfaces of the backrest 112 and the cushion 114 may allow the driver to feel cool.

In this case, the second fan 115 protrudes from a lowermost end of the ventilated seat 110. That is, the second fan 115 protrudes further than a lower end of the cushion 114. In addition, the second nozzle 232 is disposed at the same height as the second fan 115. With this arrangement, the air discharged from the second nozzle 232 may be effectively transmit and reach the second fan 115 without an obstacle that reduces a flow rate.

The suspension 120 is installed at a lower end of the ventilated seat 110 and mitigates impact. Unlike passenger vehicles, the construction machine travels or works on a significantly uneven road surface on which a large number of obstacles are present, and significant vibration is frequently transmitted to the cabin. Therefore, the suspension 120 is installed to reduce the driver's fatigue caused by the vibration. However, the suspension 120 is coupled to the lower end of the cushion 114 and hinders an air flow below the ventilated seat 110. That is, in general, this structure is disadvantageous in ventilating the construction machine.

The air conditioning device 210 refers to a device for adjusting indoor air of the cabin and supplies air after appropriately adjusting a temperature and a humidity of the air through processes of sucking, filtering, heating, and cooling outside air. The air conditioning device 210 is called HVAC (heating, ventilation, and air conditioning) and may perform heating, ventilating, and cooling operations, as necessary. Hereinafter, the description will be made on the premise that the air conditioning device 210 performs the cooling operation according to the object and effect of the present invention. However, the air conditioning device 210 is not limited to a cooler.

The position at which the air conditioning device 210 is installed may vary depending on a size of the construction machine, a layout of the cabin, and the like. Specific examples in which the air conditioning device is installed at different positions will be described below with reference to other embodiments.

The air of which the temperature and the humidity are adjusted by the air conditioning device 210 flows to the first duct 220. The first duct 220 extends from the air conditioning device 210 toward an upper side of the cabin. The first nozzle 222 is disposed at the end of the first duct 220 and discharges the air, which flows to the first duct 220, into the interior of the cabin.

In this case, the second duct 230 branches off from the first duct 220. That is, the flow of air supplied from the air conditioning device 210 is divided into air flows in the first duct 220 and the second duct 230. The first and second ducts 220 and 230 extend in different directions and have different sizes, such that there may be a difference between flow rates of air flowing through the first and second ducts 220 and 230. In the present embodiment, the first duct 220 corresponds to a main duct, and the second duct 230 corresponds to a sub-duct. A flow rate of the air flowing through the first duct 220 is higher than a flow rate of the air flowing through the second duct 230. That is, the second duct 230 is formed so as not to significantly reduce a flow rate in the first duct 220.

The first duct 220 includes a first part 220a extending upward, and a second part 220b branching off from an upstream of the first part 220a in a lateral direction. The second part 220b serves to supplement a flow rate toward the first duct 220 which is insufficient because of the second duct 230.

The second duct 230 branches off from a most upstream side of the first duct 220 and allows the flow of air discharged from the air conditioning device 210 to be directed directly toward the second duct 230, thereby enabling efficient distribution of the flow rate.

The second duct 230 extends toward the ventilated seat 110. In other words, since the air conditioning device 210 and the first duct 220 are positioned rearward from the ventilated seat 110, the second duct 230 extends toward a front surface of the cabin.

The second nozzle 232 is disposed at the end of the second duct 230. The second nozzle 232 guides the air so that the air is discharged in a direction toward the position at which the ventilated seat 110 is positioned.

A plate 240 is installed between the air conditioning device 210 and the ventilated seat 110. The plate 240 spatially separates the air conditioning device 210 and the first and second ducts 220 and 230 from the interior of the cabin. The second duct 230 extends to a rear surface of the plate 240, and an opening is formed in the plate 240, such that the second nozzle 232 is positioned in the opening.

The second nozzle 232 is opened toward a rear side of the ventilated seat 110. Therefore, the air flowing along the second duct 230 is discharged toward the rear side of the ventilated seat 110 from the second nozzle 232.

As illustrated in FIG. 9, a direction in which the second nozzle 232 is opened may be adjusted in upward, downward, leftward, and rightward directions. Therefore, the driver may adjust an angle of the second nozzle 232 so that the air may be discharged in an appropriate direction that conforms to a height or position of the ventilated seat 110. In addition, the second nozzle 232 is openable and closable. In some instances, the second nozzle 232 is closed so that the air is not discharged.

As illustrated in FIGS. 10 and 11, the air, which is discharged toward the rear side of the ventilated seat 110 from the second nozzle 232, flows toward the first and second fans 113 and 115. Further, when the first and second fans 113 and 115 rotate, the cold air discharged from the second nozzle 232 is transmitted to the inside of the ventilated seat 110, such that the driver may feel cool. In this case, when the second nozzle 232 is opened upward, a larger amount of air flows to the first fan 113, such that a temperature of the inner surface of the backrest 112 decreases. On the contrary, when the second nozzle 232 is opened downward, a larger amount of air flows to the second fan 115, such that a temperature of an upper surface of the cushion 114 decreases.

As illustrated in FIGS. 14 and 15, there is a significant difference in sensible cooling effect between the presence and absence of the second nozzle 232 according to the present embodiment. In brief, the construction machine according to the present embodiment implements an effect of lowering a temperature by 5 degrees to 8 degrees, which is a numerical value that may provide the driver with significant comfortability.

In addition, according to the present embodiment, the sensible cooling effect may be maximized only by adding the second duct 230 and the second nozzle 232, and thus a high effect may be exhibited at low cost. That is, the effect may be implemented only by a minimum change in design of a duct structure without adding an air conditioning device or changing a structure of the ventilated seat.

Therefore, the present invention may be applied to various construction machines having different layouts. FIG. 12 illustrates a construction machine according to another embodiment of the present invention in which an air conditioning device is installed at a lateral side of a ventilated seat, and FIG. 13 illustrates a construction machine according to still another embodiment of the present invention in which an air conditioning device is installed at a lower side of a ventilated seat.

Specifically, as illustrated in FIG. 12, in the construction machine according to another embodiment of the present invention, a second duct 330 extends toward a rear side of a plate 340 from an air conditioning device 310 positioned at a lateral side of a ventilated seat 110', and a second nozzle 332 is disposed at an end of the second duct 330 and discharges air toward a rear side of the ventilated seat 110'.

In addition, as illustrated in FIG. 13, in the construction machine according to still another embodiment of the present invention, a second duct 430 branches off from a first duct 420 and extends from an air conditioning device 410 positioned at a lower side of a ventilated seat 110", and a second nozzle 432 is disposed at an end of the second duct 430 and discharges air toward a rear side of the ventilated seat 110".

As described above, the present invention may be appropriately changed and carried out to conform to the air conditioning devices installed at various positions depending on types or sizes of construction machines.

Hereinafter, an operational effect according to the embodiment of the present invention will be described.

As described above, unlike the passenger vehicles, the construction machine is characterized in that the suspension is coupled to the lower portion of the seat, and the air supplied from the air conditioning device is discharged to the driver's rear side. For this reason, in the related art, the cooling effect, which the driver actually feels, is not high even though the ventilated seat is applied.

In contrast, according to the embodiments of the present invention, the separate second duct 230, 330, or 430 branches in the direction toward the ventilated seat 110, 110', or 110", and the second nozzle 232, 332, or 432 is disposed at the end of the second duct 230, 330, or 430, such that the air may be discharged to the ventilated seat 110, 110', or 110". Therefore, the cold air discharged from the second nozzle 232, 332, or 432 may directly reach the ventilated seat 110, 110', or 110", thereby significantly improving the sensible cooling effect.

DESCRIPTION OF REFERENCE NUMERALS

20: Cabin
21: Cabin frame
22: Seat
23: Suspension
24: Air conditioning device
25: Duct
26: Nozzle
110: Ventilated seat
112: Backrest
113: First fan
114: Cushion
115: Second fan
120: Suspension
210: Air conditioning device
220: First duct
220a: First part
220b: Second part
222: First nozzle
230: Second duct
232: Second nozzle
240: Plate
110': Ventilated seat
310: Air conditioning device
330: Second duct
332: Second nozzle
340: Plate
110": Ventilated seat
410: Air conditioning device
420: First duct
430: Second duct
432: Second nozzle

What is claimed is:

1. A construction machine, which comprises a cabin in which a driver is seated, the construction machine comprising:
a ventilated seat having a first fan and a second fan;
an air conditioning device configured to adjust an internal temperature of the cabin;
ducts extending from the air conditioning device, installed behind the ventilated seat in the cabin, and configured to guide an air to flow to behind the ventilated seat; and
a plate disposed between the ventilated seat and the air conditioning device,
wherein the ducts comprise:
a first duct extending toward an upper side of the cabin;
a second duct extending toward a rear side of the ventilated seat; and
a nozzle disposed at an end of the second duct,
wherein the ventilated seat further comprises a backrest configured to support an upper body of the driver, and the first fan is installed in the backrest,
wherein the ventilated seat further comprises a cushion configured to support a lower body of the driver, and the second fan is installed in the cushion,
wherein the second fan protrudes from a lowermost end of the ventilated seat,
wherein the nozzle is disposed at the same height as the second fan,
wherein the plate separates the air conditioning device from the ventilated seat and includes an opening,
wherein the second duct branches off from the first duct and is elongated in a horizontal direction to a rear surface of the plate toward the rear side of the ventilated seat, and
wherein the nozzle disposed at the end of the second duct is positioned in the opening of the plate.

2. The construction machine of claim 1,
wherein the ducts further comprise a further nozzle disposed at an end of the first duct and configured to discharge the air, which flows to the first duct, into an interior of the cabin, and
wherein the nozzle disposed at the end of the second duct is opened in a direction to discharge the air toward the rear side of the ventilated seat.

3. The construction machine of claim 2, wherein the nozzle disposed at the end of the second duct is configured as a variable nozzle configured to adjust a direction in which the air is discharged.

4. The construction machine of claim 1, wherein the second duct branches off from a most upstream side of the first duct.

5. The construction machine of claim 1, wherein the first duct comprises:
a first part extending upward; and
a second part branching off from an upstream side of the first part in a lateral direction.

6. A construction machine, which comprises a cabin in which a driver is seated, the construction machine comprising:
a ventilated seat having a first fan and a second fan;
an air conditioning device configured to adjust an internal temperature of the cabin;
ducts extending from the air conditioning device, installed behind the ventilated seat in the cabin, and configured to guide an air flow to behind the ventilated seat, the ducts branching to comprise a first duct extending to an upper side of the cabin, and a second duct extending to a rear side of the ventilated seat;
a first nozzle disposed at an end of the first duct;
a second nozzle disposed at an end of the second duct; and
a plate disposed between the ventilated seat and the air conditioning device, wherein the second nozzle is opened in a direction in which air is discharged toward the rear side of the ventilated seat, the ventilated seat comprises a cushion configured to support a lower body of the driver, and the second fan is installed in the cushion,
wherein the second nozzle is disposed at the same height as the second fan,
wherein the ventilated seat comprises
a backrest configured to support an upper body of the driver, and
the first fan is installed in the backrest,
wherein the plate separates the air conditioning device from the ventilated seat and includes an opening,
wherein the second duct branches off from the first duct and is elongated in a horizontal direction to a rear surface of the plate toward the rear side of the ventilated seat, and
wherein the nozzle disposed at the end of the second duct is positioned in the opening of the plate.

7. The construction machine of claim 1, wherein the air conditioning device is installed at a lateral side of the ventilated seat.

8. The construction machine of claim 1, wherein the air conditioning device is installed at a lower side of the ventilated seat.

9. The construction machine of claim 1, wherein
the nozzle disposed at the end of the second duct is disposed away from the second fan in the horizontal direction and is disposed at a height lower than the first fan, and
the nozzle disposed at the end of the second duct is configured to discharge the air toward the rear side of the ventilated seat and toward the first and second fans.

10. The construction machine of claim 9, wherein when the nozzle disposed at the end of the second duct is opened upward, an amount of air flowing to the first fan is larger than an amount of air flowing to the second fan to decrease a temperature of an inner surface of the backrest.

11. The construction machine of claim 10, wherein when the nozzle disposed at the end of the second duct is opened downward, the amount of the air flowing to the second fan is larger than the amount of the air flowing to the first fan to decrease a temperature of an upper surface of the cushion.

* * * * *